United States Patent
Cao et al.

(10) Patent No.: US 12,487,373 B2
(45) Date of Patent: Dec. 2, 2025

(54) DENOISING METHODS AND SYSTEMS FOR PRESERVING AMPLITUDE VARIATION WITH OFFSET (AVO) FEATURES OF PRE-STACK SEISMIC DATA

(71) Applicant: SOUTHWEST PETROLEUM UNIVERSITY, Sichuan (CN)

(72) Inventors: Weiping Cao, Chengdu (CN); Ran Yang, Chengdu (CN); Xuri Huang, Chengdu (CN); Xiaoqing Cui, Chengdu (CN); Mengcheng Li, Chengdu (CN); Luo Li, Chengdu (CN); Haoyuan Li, Chengdu (CN); Mengyu Ren, Chengdu (CN); Sheng Yang, Sichuan (CN); Moyan Li, Chengdu (CN); Xinwang Li, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 295 days.

(21) Appl. No.: 18/329,564

(22) Filed: Jun. 5, 2023

(65) Prior Publication Data
US 2024/0045093 A1    Feb. 8, 2024

(30) Foreign Application Priority Data
Aug. 2, 2022 (CN) .......................... 202210919601.7

(51) Int. Cl.
  *G01V 1/36* (2006.01)
  *G01V 1/30* (2006.01)
(52) U.S. Cl.
  CPC .............. *G01V 1/362* (2013.01); *G01V 1/307* (2013.01)
(58) Field of Classification Search
  CPC ................................ G01V 1/362; G01V 1/307
  See application file for complete search history.

(56) References Cited

U.S. PATENT DOCUMENTS

| 9,684,087 B2 * | 6/2017 | Yang ........................ G01N 29/32 |
| 2017/0059728 A1 * | 3/2017 | Cui ........................... G01V 1/30 |

FOREIGN PATENT DOCUMENTS

| CN | 101116008 A | 1/2008 |
| CN | 101315427 A | 12/2008 |

(Continued)

OTHER PUBLICATIONS

Wang et al., "A Seismic Signal Denoising Method Based on Wavelet Comprehensive Threshold", 2019, ITM Publication, pp. 1-3 (Year: 2019).*

(Continued)

*Primary Examiner* — Elias Desta
(74) *Attorney, Agent, or Firm* — METIS IP LLC

(57) ABSTRACT

The present disclosure discloses a denoising method and a system for preserving amplitude variation with offset (AVO) features of pre-stack seismic data. The method includes: acquiring seismic wave data at at least one receiving point through a seismic signal acquisition device, and storing the seismic wave data in a memory; in response to ending of an acquisition operation of the seismic signal with the seismic signal acquisition device, determining, based on the seismic wave data in the memory, pre-denoising angle gather data through a processing device; and obtaining and outputting a denoised angle gather signal through inputting the pre-denoising angle gather data to a denoising device and performing denoising processing on the pre-denoising angle gather data based on the denoising device. In the present disclosure, an abnormal signal is identified in the memory, then the angle gather signal is denoised, and a user also use a user terminal to view signals before and after denoising and compare a denoising effect, which can improve denoising efficiency and accuracy.

12 Claims, 5 Drawing Sheets

(56) References Cited

FOREIGN PATENT DOCUMENTS

| | | | |
|---|---|---|---|
| CN | 103869364 | A | 6/2014 |
| CN | 112213775 | A | 1/2021 |
| CN | 112379438 | A | 2/2021 |
| CN | 113589384 | A | 11/2021 |
| CN | 113985480 | A | 1/2022 |
| WO | 9714062 | A1 | 4/1997 |
| WO | 9906855 | A1 | 2/1999 |
| WO | 2011005353 | A1 | 1/2011 |

OTHER PUBLICATIONS

First Office Action in Chinese Application No. 202210919601.7 mailed on Jan. 23, 2025, 12 pages.
Notification to Grant Patent Right for Invention in Chinese Application No. 202210919601.7 mailed on Mar. 12, 2025, 2 pages.

* cited by examiner

DENOISING METHODS AND SYSTEMS FOR PRESERVING AMPLITUDE VARIATION WITH OFFSET (AVO) FEATURES OF PRE-STACK SEISMIC DATA

CROSS-REFERENCE TO RELATED APPLICATIONS

This application claims priority of the Chinese Patent Application No. 202210919601.7, filed on Aug. 2, 2022, the entire contents of which are hereby incorporated by reference.

TECHNICAL FIELD

The present disclosure relates to the field of seismic gather optimization, and in particular, to a denoising method and a denoising system for preserving amplitude variation with offset (AVO) features of pre-stack seismic data.

BACKGROUND

Denoising of seismic data is very important for exploration of oil and gas reservoirs. At present, amplitude variation with offset (AVO) technology is a crucial and irreplaceable tool for oil and gas exploration because AVO inversion enables accurate estimation of elastic properties of subsurface rock and generates oil-gas indications. Noise in seismic data can severely reduce the accuracy of AVO inversion and increase the risk in oil and gas exploration.

However, the pre-stack seismic data are usually seriously affected by noise interferences. If any processing step needs to be applied to the pre-stack data, the noise in the pre-stack data should be reduced first to improve the data quality. In many areas, pre-stack records are seriously covered with various noise interferences, and the events of an effective signal can hardly be identified, which brings great difficulties to AVO analysis and AVO inversion based on pre-stack gathers. Therefore, it is very necessary to study and apply a new denoising method for seismic data to ensure the quality of input data of pre-stack AVO inversion.

SUMMARY

One of the embodiments of the present disclosure provides a denoising method that preserves amplitude variation with offset (AVO) features of pre-stack seismic data, which is implemented based on a denoising system for preserving AVO features of pre-stack seismic data. The method includes: acquiring seismic wave data at at least one receiving point through a seismic signal acquisition device, and storing the seismic wave data in a memory; in response to ending of an acquisition operation for the seismic signal with the seismic signal acquisition device, determining, based on the seismic wave data in the memory, pre-denoising angle gather data through a processing device; and obtaining and outputting a denoised angle gather signal through inputting the pre-denoising angle gather data to a denoising device and performing denoising processing on the pre-denoising angle gather data based on the denoising device.

One of the embodiments of the present disclosure provides a denoising system for preserving AVO features of pre-stack seismic data. The system includes: a seismic signal acquisition device configured to acquire seismic wave data at at least one receiving point; a memory configured to store the seismic wave data; a processing device configured to determine pre-denoising angle gather data based on the seismic wave data; and a denoising device configured to perform denoising processing on the pre-denoising angle gather data to obtain and output a denoised angle gather signal.

One of the embodiments of the present disclosure provides a non-transitory computer-readable storage medium, wherein computer-executable instructions are stored, and the computer-executable instructions are executed by at least one processor to implement the denoising method for preserving the AVO features of the pre-stack seismic data.

BRIEF DESCRIPTION OF THE DRAWINGS

The present disclosure is further described in terms of exemplary embodiments. These exemplary embodiments are described in detail with reference to the drawings. These embodiments are not limited, in these embodiments, the same numeral denotes the same structure, wherein.

DETAILED DESCRIPTION

Figure 1:
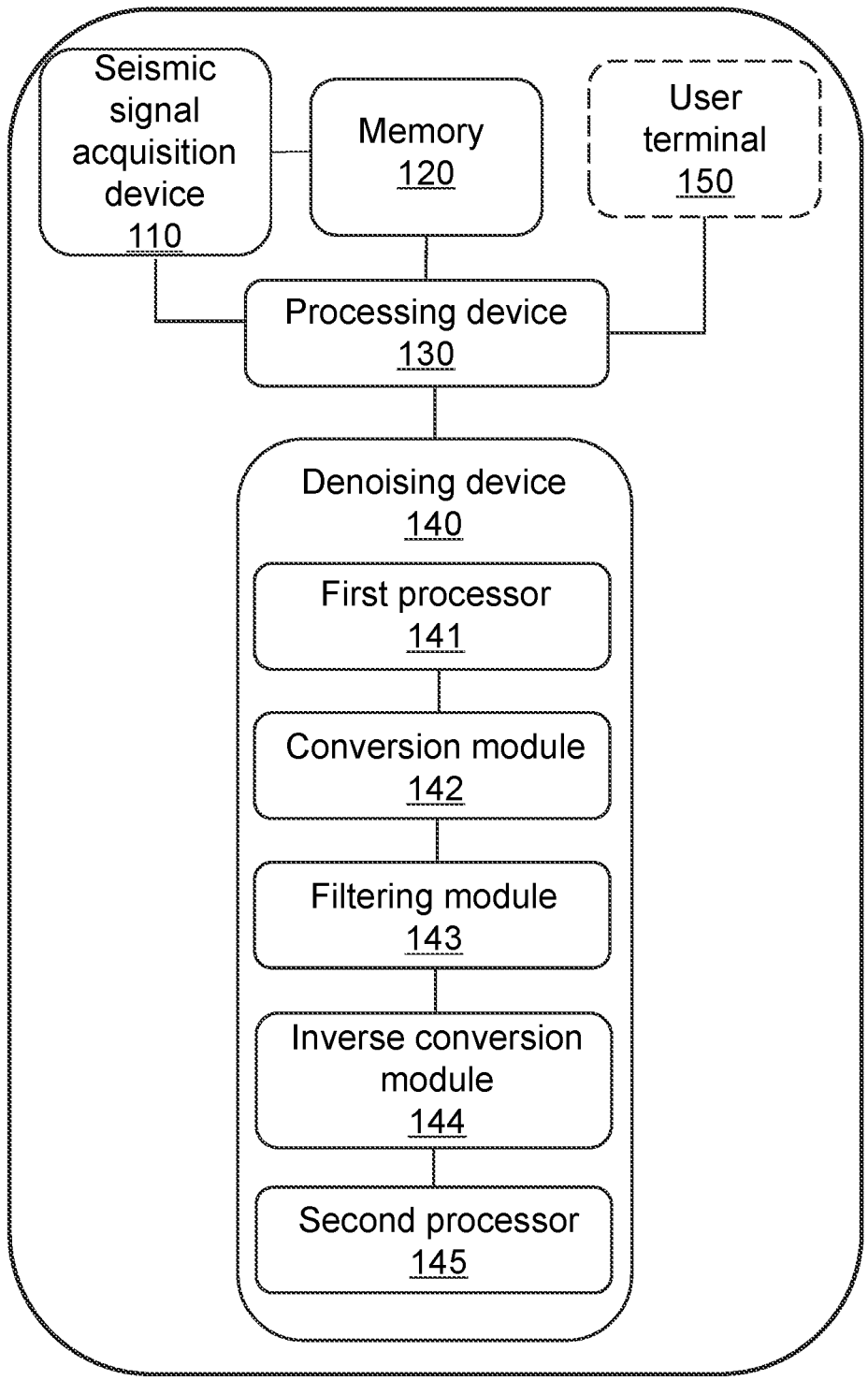
FIG. 1 is a block diagram illustrating a structure of a denoising system for preserving amplitude variation with offset (AVO) features of pre-stack seismic data according to some embodiments of the present disclosure.

In order to illustrate the technical solutions of the embodiments of the present disclosure more clearly, the following will briefly introduce the drawings that need to be used in the description of the embodiments. Obviously, the drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the terms "system," "device," "unit," and/or "module" used herein are one method to distinguish different components, elements, parts, sections, or assemblies of different levels. However, the words may be replaced by other expressions if other words can achieve the same purpose.

As indicated in the present disclosure and claims, the terms "a", "an", and/or "the" are not specific to the singular and may include the plural unless the context clearly indicates an exception. Generally speaking, the terms "comprising" and "including" only suggest the inclusion of clearly identified steps and elements, and these steps and elements do not constitute an exclusive list, and the method or device may also contain other steps or elements.

The flowcharts are used in the present disclosure to illustrate the operations performed by the system according to the embodiment of the present disclosure. It should be understood that the preceding or following operations are not necessarily performed exactly in order. Instead, various steps may be processed in reverse order or simultaneously. At the same time, other operations may be added to these procedures, or a certain step or steps may be removed from these procedures.

FIG. 1 is a block diagram illustrating a structure of a denoising system for preserving AVO features of pre-stack seismic data according to some embodiments of the present disclosure. In some embodiments, a system 100 may include a seismic signal acquisition device 110, a memory 120, a processing device 130, and a denoising device 140.

The seismic signal acquisition device 110 may be an electronic device (such as a seismic exploration instrument, a seismic geophone, etc.) that collects a vibration signal by induction. In some embodiments, the seismic signal acquisition device 110 may be configured to acquire seismic wave data transmitted between a shot point of a seismic reflection amplitude and a receiving point.

In some embodiments, the seismic signal acquisition device 110 may be configured to acquire seismic wave data at at least one receiving point.

The receiving point may be a location where seismic waves are received during a survey process, which may spatially correspond to a location where the seismic waves are triggered (i.e., the shot point of the seismic reflection amplitude). Due to diffusivity of the seismic waves, in some embodiments, one or more receiving points may be set to collect different seismic wave data at different distances. Correspondingly, in some optional embodiments, a plurality of seismic signal acquisition devices 110 may be provided, and the plurality of seismic signal acquisition devices 110 are respectively arranged at different receiving points to collect the seismic wave data. In some optional embodiments, a plurality of sensing components of the seismic signal acquisition device 110 may be respectively arranged at different receiving points to acquire the seismic wave data.

In some embodiments, the seismic wave data may be used to observe or predict various subsurface parameters. For example, a formation elastic parameter may be predicted based on seismic wave data through a pre-stack seismic inversion developed by the amplitude variation with offset (AVO) theory. In some embodiments, the seismic wave data may include data such as a distance between the shot point and the receiving point or features of received seismic waves, etc.

In some embodiments, the seismic signal acquisition device 110 may acquire the seismic waves through components such as induction antennas, so as to realize an acquisition of the seismic wave data. In some embodiments, the seismic signal acquisition device 110 may be connected to the processing device 130 and the memory 120, and transmit the seismic wave data to the processing device 130 and the memory 120.

The memory 120 may include one or more computer program products, which may include various forms of computer storage mediums, such as a volatile memory and/or a nonvolatile memory. The volatile memory 120 may include, for example, a random access memory (RAM) and/or a cache memory, etc. One or more computer program instructions may be stored on a computer storage medium, and the processing device 130 may execute the program instructions to implement decision-making behaviors and decision-making methods and/or other desired functions of various embodiments of the present disclosure hereinafter.

In some embodiments, the memory 120 may be configured to store the seismic wave data for the processing device 130 to read.

The processing device 130 may be an electronic device that processes data obtained from other devices and/or regulates other devices. In some embodiments, the processing device 130 may be a circuit unit such as an application specific integrated circuit (ASIC), a programmable gate array (FPGA), etc. In some embodiments, the processing device 130 may perform data transmission with the seismic signal acquisition device 110, the memory 120, and the denoising device 140. For example, the processing device 130 may transmit the pre-denoising angle gather data to the denoising device 140 through a data bus.

In some embodiments, the processing device 130 may call an algorithm from the memory 120 so that the system 100 may execute the denoising method for preserving the AVO features of the pre-stack seismic data, and its specific implementation may be found in the following FIGS. 2-5 and related descriptions. In some embodiments, the processing device 130 may determine the pre-denoising angle gather data based on the seismic wave data. For example, the processing device 130 may designate the acquired seismic wave data as the pre-denoising angle gather data. Further descriptions regarding the angle gather data may be found in the following FIGS. 2-5 and related descriptions thereof.

The denoising device 140 may be an electronic device for denoising signals. In some embodiments, the denoising device 140 may be configured to perform denoising processing on the pre-denoising angle gather data to obtain a denoised angle gather signal. In some embodiments, the denoising device 140 may be connected to the processing device 130, the denoising device 140 may receive the pre-denoising angle gather data from the processing device 130 and transmit the denoised angle gather signal to the processing device 130, so as to make the denoising device 130 output the denoised angle gather signal.

In some embodiments, the denoising device 140 may include a first processor 141, a conversion module 142, a filtering module 143, an inverse conversion module 144, and a second processor 145. The first processor 141, the conversion module 142, the filtering module 143, the inverse conversion module 144, and the second processor 145 may be connected to each other for data transmission.

In some embodiments, the first processor 141 may be configured to perform division processing for overlapping time windows on the angle gather to determine a range of reflection time t in the angle gather.

In some embodiments, the conversion module 142 may be configured to convert the pre-denoising angle gather data from the angle domain to the feature domain in a preset manner based on the range of reflection time t. The preset manner may be a signal processing manner such as a compressive sensing algorithm.

In some embodiments, the filtering module 143 may be configured to perform preset processing on the pre-denoising angle gather data in the feature domain to obtain an effective signal meeting a preset condition. The preset condition may be that the effective signal fully maintains the AVO features of original data.

In some embodiments, the inverse conversion module 144 may be configured to perform inverse conversion processing on the effective signal to obtain an optimized angle gather signal in a corresponding time window.

In some embodiments, the second processor 145 may be configured to perform splicing processing for overlapping time windows on the optimized angle gather signal in a plurality of time windows to obtain a complete denoised angle gather signal, which achieves the denoising of the AVO features of the pre-stack seismic data.

Further descriptions regarding each module in the denoising device 140 may be found in the following FIGS. 2-5 and related descriptions thereof.

In some embodiments, the system 100 may further include a user terminal 150. The user terminal 150 refers to an electronic device used by users and may include various mobile devices, smart devices, wearable devices, etc., for example, a mobile phone, a smartwatch, etc. In some embodiments, the user terminal 150 may be configured to display the denoised angle gather signal and the pre-denoising angle gather data, and obtain user confirmation information. In some embodiments, the user terminal 150 may establish a communication channel with the processing device 130 through the network to transmit data such as the user confirmation information, the denoised angle gather signals, and the pre-denoising angle gather data, etc.

In some embodiments, the user terminal 150 may display the denoised angle gather signal and the pre-denoising angle gather data for the users by displaying images, videos, etc. According to information displayed on the user terminal 150, the users may visually view changes in the angle gather signal before and after denoising to confirm a denoising effect to determine whether a current denoising result (i.e., the denoised angle gather signal) is available.

If the denoising effect is good and the denoised angle gather signal is available, the users may transmit the user confirmation information to the processor through the user terminal 150. The user confirmation information may be used to instruct the processing device 130 to retain the denoised angle gather signal.

In some embodiments, the user terminal 150 may obtain the user confirmation information by collecting a user-typed command, touching a button, inputting voice, etc.

In some embodiments, the system 100 may be arranged in processing equipment as a circuit component and connected with the processing equipment to transmit data and signals; and may also be integrated into the processing equipment, so that the processing equipment may realize input and output functions through a built-in communication component.

The processing equipment may be a central processing unit or other processing units having data processing capabilities and/or instruction execution capabilities, which may control other components in the system 100 to perform desired functions.

It should be noted that the foregoing description of the denoising system for preserving the AVO features of the pre-stack seismic data is only for the convenience of description, and does not limit this description to the scope of the illustrated embodiments. It should be understood that, for those skilled in the art, after understanding the principles of the system, it is possible to combine various modules arbitrarily or form a sub-system to connect with other modules without departing from the principles. In some embodiments, the processing device, the memory, the denoising device, and the seismic signal acquisition device disclosed in FIG. 1 may be different modules in a system, or one module that realizes functions of the above two or more modules. For example, each module may share a storage module, and each module may also have a respective storage module. Those variations and modifications may be within the scope of the protection of one or more embodiments of the present disclosure.

Figure 2:
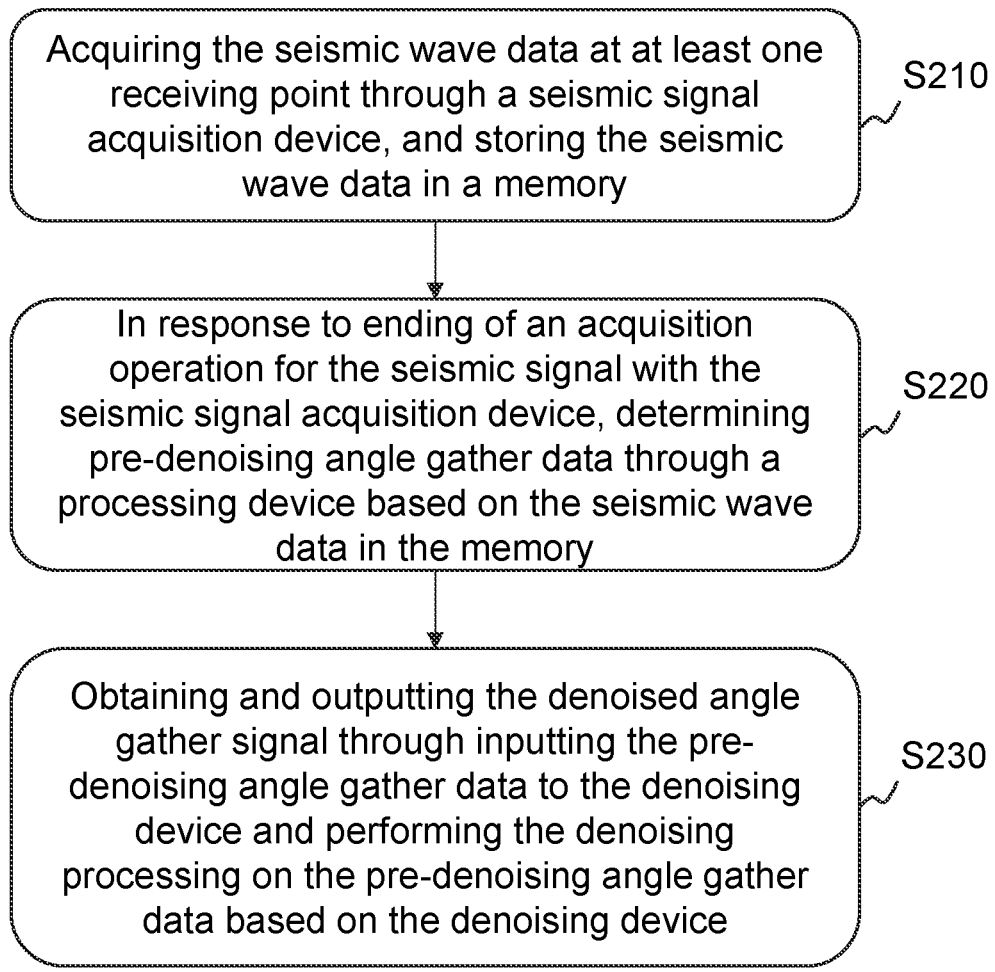
FIG. 2 is a flowchart illustrating an exemplary process of a denoising method for preserving AVO features of pre-stack seismic data according to some embodiments of the present disclosure.

FIG. 2 is a flowchart illustrating an exemplary process of a denoising method for preserving AVO features of pre-stack seismic data according to some embodiments of the present disclosure.

In some embodiments, as shown in FIG. 2, the processing equipment may execute a process 200 to process seismic wave data, and the process 200 includes following steps.

Step S210: acquiring the seismic wave data at at least one receiving point through a seismic signal acquisition device, and storing the seismic wave data in a memory.

In some embodiments, the processing equipment may send acquisition instructions to the seismic signal acquisition device to drive the seismic signal acquisition device to acquire seismic wave data at at least one receiving point. The processing equipment may also receive the seismic wave data from the seismic signal acquisition device, and store the seismic wave data in the memory.

Step S220: in response to ending of an acquisition operation for the seismic signal with the seismic signal acquisition device, determining pre-denoising angle gather data through a processing device based on the seismic wave data in the memory.

An angle trace is a collection of traces in which the expected reflection angles are recorded at a fixed offset, and angle gathers are collections of traces in which the above-mentioned recording is repeated for different reflection angles. In some embodiments, the angle gather data may be determined based on the seismic wave data acquired by the seismic signal acquisition device. In some embodiments, the seismic wave data acquired by the seismic signal acquisition device may include the pre-denoising angle gather data and an abnormal signal. The abnormal signal may be abnormal angle gather data caused by acquisition errors, equipment failures, etc. Specific realization manners of the seismic signal acquisition device, the receiving point, and the acquisition of seismic wave data may be found in FIG. 1 and related descriptions thereof.

In some embodiments, the processing equipment may control the processing device to preprocess the seismic wave data in the memory, to remove the abnormal signal in the seismic wave data and obtain the pre-denoising angle gather signal.

Preprocessing may be a signal processing manner for identifying and filtering the abnormal signal. In some embodiments, the processing equipment may identify the abnormal signal in the memory, eliminate the abnormal signal, and designate the entire remaining seismic wave data as the pre-denoising angle gather data. In some embodiments, the processing equipment may identify the abnormal signal in multiple ways, for example, the processing equipment may identify the abnormal signal in the memory that is similar to a historical abnormal signal based on the historical abnormal signal identified in historical preprocessing. Specific implementation manners of the memory may be found in FIG. 1 and related descriptions thereof.

In some embodiments, the pre-denoising angle gather data may include angle gather data and noise signal. The noise signal may be noise generated due to environmental interferences and electromagnetic interferences, which may affect analyzing the angle gather signal, so denoising processing is further required. Further description of denoising processing may be found in step S230.

In some embodiments, the processing equipment may respond to ending of the acquisition operation for the seismic signal with the seismic signal acquisition device when receiving an ending instruction from the seismic signal acquisition device; and also respond to ending of acquisition operation for the seismic signal with the seismic signal acquisition device when a preset ending time is reached.

Step S230: obtaining and outputting the denoised angle gather signal through inputting the pre-denoising angle gather data to the denoising device and performing the denoising processing on the pre-denoising angle gather data based on the denoising device.

The denoising processing may be a signal processing manner for removing the noise signal. In some embodiments, the processing equipment may identify and filter the noise signal in the pre-denoising angle gather data based on the denoising device, and retain the denoised angle gather signal. Specific implementation manners of the denoising device may be found in FIG. 1 and related descriptions thereof. Specific implementation manners of the denoising processing may be found in FIGS. 3-5 and related descriptions thereof.

In some embodiments, the processing equipment may output the denoised angle gather signal for pre-stack data analysis. Further, in some embodiments, the processing equipment may send the denoised angle gather signal and the pre-denoising angle gather data to a user terminal for display and confirmation. Correspondingly, in some embodiments, the user terminal may display the denoised angle gather signal and the pre-denoising angle gather data for users by displaying images, videos, etc. According to information on the user terminal, the user may visually view changes in the angle gather signals before and after denoising to confirm a denoising effect to determine whether a denoising result (i.e., the denoised angle gather signal) is available.

In the embodiment of the present disclosure, the abnormal signal is identified in the memory, then the angle gather signal is denoised, and the users may also use the user terminal to view signals before and after denoising and compare the denoising effect, so as to improve denoising efficiency and accuracy.

Figure 3:
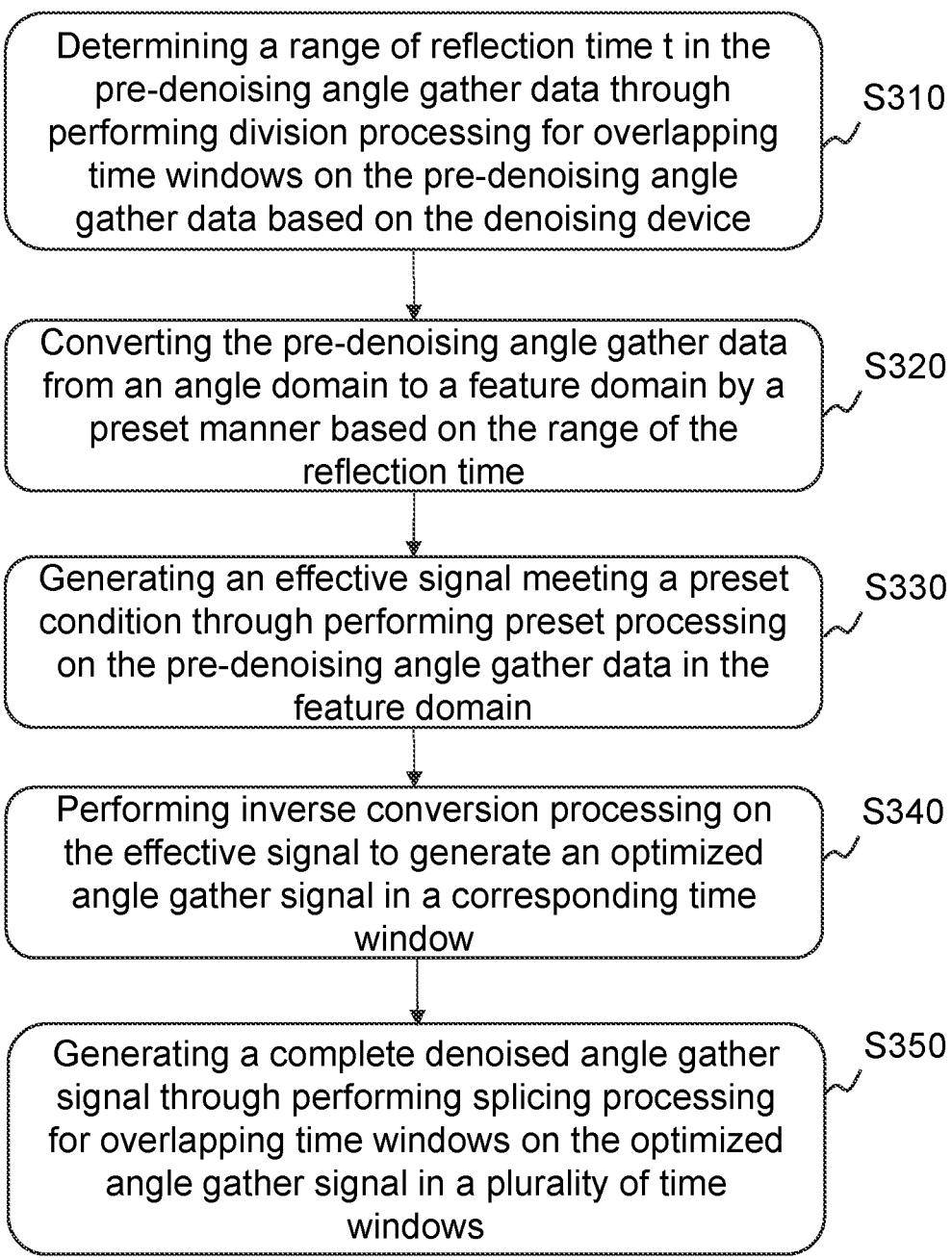
FIG. 3 is a flowchart illustrating an exemplary process of denoising processing according to some embodiments of the present disclosure.

FIG. 3 is a flowchart illustrating an exemplary process of denoising processing according to some embodiments of the present disclosure.

In some embodiments, as shown in FIG. 3, the processing equipment may control a denoising device to execute a process 300, so as to perform denoising processing on pre-denoising angle gather data, and the process 300 includes follow steps.

Step S310: determining a range of reflection time t in the pre-denoising angle gather data through performing division processing for overlapping time windows on the pre-denoising angle gather data based on the denoising device.

In some embodiments, the reflection time refers to a time required for seismic waves emitted from a seismic source to an underground rock and then returned to the surface, the unit of which is second (s) or millisecond (ms), which may be used to distinguish different angle gather signal.

The division processing for overlapping time windows refers to dividing a continuous time period into multiple parts in time series data, and there may be overlapping parts between the multiple parts. In some embodiments, the division processing for overlapping time windows may be used to implement data processing and analysis.

In some embodiments, the processing equipment may divide the pre-denoising angle gather data into multiple windows in a time domain by dividing overlapping time windows, and there may be overlapping parts between the multiple windows, and time ranges corresponding to the multiple windows are designated as the range of the reflection time t to analyze the pre-denoising angle gather data.

Figure 5:
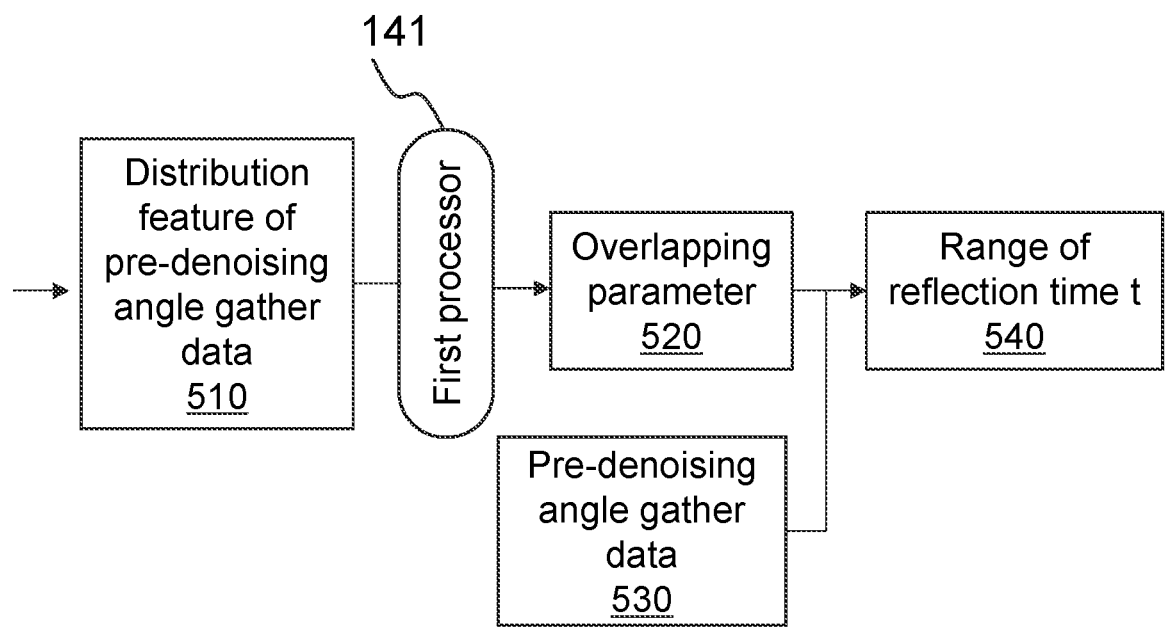
FIG. 5 is an exemplary schematic diagram illustrating a process for determining reflection time t according to some embodiments of the present disclosure.

Further descriptions regarding more manners of determining the range of the reflection time t may be found in FIG. 5 and related descriptions thereof.

Step S320: converting the pre-denoising angle gather data from an angle domain to a feature domain in a preset manner based on the range of the reflection time.

The feature domain may be a domain including AVO features, which may be configured to extract features in signals. The pre-denoising angle gather data determined by the processing equipment are signals in an angle domain, and the pre-denoising angle gather data may be converted from the angle domain to the feature domain based on the denoising device.

The preset manner may be a signal processing manner for converting the signals. In some embodiments, the preset manner may be a signal processing manner such as a compressive sensing algorithm. The specific implementation of compressive sensing may be found in formulas (1)-(2) and the related descriptions thereof.

In some embodiments, the processing equipment may use the preset manner to determine features in the feature domain corresponding to an angle based on the angle of the pre-denoising angle gather data in the angle domain, so as to convert the pre-denoising angle gather data from the angle domain to the feature domain. In some embodiments, the processing equipment may invert a first preset formula through a second preset formula to generate a model parameter m; and the pre-denoising angle gather data in pre-stack seismic data is converted from the angle domain to the feature domain based on the model parameter m.

The first preset formula (1) is as follows:

$$d(t,\theta)=D(t,\theta)+n(t,\theta) \quad (1).$$

The second preset formula (2) is as follows:

$$m=\mathrm{argmin}_m \|Rm-d(t,\theta)\|_2^2+\lambda\|m\|_1 \quad (2).$$

Where $d(t,\theta)$ denotes the pre-denoising angle gather data, $D(t,\theta)$ denotes the denoised angle gather signal, $n(t,\theta)$ denotes noise in the pre-denoising angle gather data, t denotes the reflection time, $\theta$ denotes a reflection angle; R denotes an AVO effect template matrix that a seismic reflection amplitude changes with the reflection angle $\theta$, $\lambda$ denotes a weight factor, which is greater than 0, and m denotes the model parameter.

In some embodiments, the model parameter m may be a parameter corresponding to the angle gather data in a conversion space, which may be used to characterize the AVO features in the angle gather data (i.e., the pre-denoising angle gather data).

In some embodiments, the second preset formula may be an inversion algorithm based on a compressive sensing theory.

In some embodiments, the inversion algorithm may be used to solve the model parameter m in the second preset formula, and separate the angle gather signal and the noise during a domain conversion process of the signal.

Correspondingly, in some embodiments, the processing equipment may use the compressive sensing algorithm to obtain the second preset formula (2). In order to convert the pre-denoising angle gather data d from the angle domain to the feature domain, the processing equipment uses the second preset formula (2) to obtain the angle gather signal D that is close to an actual denoised angle gather signal through a 1-norm regularization constraint inversion, to solve a converted model parameter m. Correspondingly, in some embodiments, the processing equipment may also use the model parameter m obtained by the inversion to inversely convert the denoised angle gather signal D from the feature domain to the angle domain. The specific implementation of the inverse conversion may be found in the following related descriptions.

Step S330: generating an effective signal meeting a preset condition through performing preset processing on the pre-denoising angle gather data in the feature domain.

The preset condition may be used to restrict angle gather data after the preset processing. In some embodiments, the preset condition may be that the effective signal may fully maintain AVO features of original angle gather data, so as to ensure that quality of the effective signal may meet input requirements of pre-stack AVO inversion.

The effective signal may be a signal that is pre-processed and meets the preset condition. In some embodiments, the effective signal may be an angle gather signal that fully maintains the AVO features of the original angle gather data in the feature domain, which may be used to determine input data of the pre-stack AVO inversion.

In some embodiments, the preset processing may be a signal processing manner such as identifying, reducing, and filtering noise, etc. in the pre-denoising angle gather data. In some embodiments, the preset processing may include a signal processing manner such as reducing noise amplitude and filtering signals, etc. Correspondingly, after solving the model parameter m by minimizing the second preset formula (2), the processing equipment may perform the preset processing to eliminate noise in the pre-denoising angle gather data in the feature domain to obtain an effective signal meeting the preset condition.

In some embodiments, the preset processing may include two-dimensional filtering processing. The two-dimensional filtering processing may be a signal processing manner for filtering noise from two dimensions of an angle range and a frequency range. Correspondingly, in some embodiments, the processing equipment may perform two-dimensional filtering processing on the angle gather data in the feature domain to obtain an effective signal that fully maintains the AVO features of the original data.

In practical application, according to specific requirements and data features, an appropriate filter type and an appropriate filtering parameter may be selected in combination with other image processing techniques such as image threshold processing, morphological processing, etc., to realize the two-dimensional filtering processing on the angle gather in the feature domain.

In some embodiments, the processing equipment may perform two-dimensional filtering processing on the pre-denoising angle gather data in the feature domain with an optimal filtering parameter to generate the effective signal that meets the preset condition;

In some embodiments, the filtering parameter may include one or more combinations of the filter type, filtering strength, a filter coefficient, and a filter size. In some embodiments, the optimal filtering parameter may include at least one of the filter type and the filtering strength.

The filter type may affect a way of filtering the signal, and the filter type may include a combination of one or more types such as a Gaussian filter and a band-pass filter, etc.

The filtering strength refers to an influence degree of a filter on filtering the signal, which may be controlled by adjusting parameters such as the filter coefficient, the filter size, and the filter type.

The filter coefficient refers to a weight value of the filter, which may be used to calculate an output value of each pixel. The filter coefficient may depend on a selected filter type and a selected filter size, which may be determined through experimentation and optimization.

The filter size refers to a kernel size (e.g., a square kernel or a rectangular kernel, etc.) of the filter, The filter size depends on a signal feature and a processing requirement, for example, a larger filter may smooth an image and retain more low-frequency information, and a smaller filter may retain more detailed information.

A boundary processing manner is a manner for processing boundary pixels during filtering, which may include multiple manners such as zero padding, edge copying, symmetric padding, etc.

In some embodiments, the processing equipment may select at least one of multiple filtering parameters as the optimal filtering parameter to perform two-dimensional filtering processing on the pre-denoising angle gather data. In some embodiments, there are a plurality of ways for the processing equipment to select the filtering parameter, for example, the filtering parameter may be selected according to a signal feature and a processing requirement of a signal to be processed (e.g., the pre-denoising angle gather data, etc.). The signal feature of the signal to be processed may include frequency distribution feature, a signal space feature, etc. The processing requirement may include parameters such as a data noise feature, computational complexity, etc.

Exemplarily, the processing equipment may select an appropriate filter type and an appropriate cutoff frequency according to the signal frequency distribution feature. For a low-frequency signal, the processing equipment may effectively eliminate high-frequency noise by selecting a low-pass filter; and for a high-frequency signal, important high-frequency information may be retained by selecting a high-pass filter.

In some embodiments, the processing equipment may select at least one set of candidate filtering parameters through vector matching based on the signal frequency distribution feature and the data noise feature in the pre-denoising angle gather data; and generate an evaluation result by evaluating a filtering effect of the at least one set of candidate filtering parameters. A plurality of rounds of iterative updating may also be performed on the at least one set of candidate filtering parameters based on the evaluation result to obtain the optimal filtering parameter.

In some embodiments, the signal frequency distribution feature may be used to reflect a frequency feature of the pre-denoising angle gather data to determine a frequency distribution state of the pre-denoising angle gather data. For example, the signal frequency distribution feature may include proportion, distribution, etc. of the pre-denoising angle gather data in each frequency band.

In some embodiments, the data noise feature may be used to reflect a signal processing requirement to identify noise in the pre-denoising angle gather data that needs to be eliminated. In some embodiments, the data noise feature may include features such as a noise frequency band, an amplitude, etc.

In some embodiments, the processing equipment may search for similar or identical features in a vector database based on the signal frequency distribution feature and the data noise feature, and designate a corresponding filtering parameter as a candidate filtering parameter. Correspondingly, in some embodiments, the processing equipment may construct a plurality of reference vectors according to historical two-dimensional filtering processing records to form the vector database; each reference vector corresponds to a set of historical optimal filtering parameters. The reference vector may include a historical signal frequency distribution feature and a historical data noise feature.

In some embodiments, the evaluation result may include a noise elimination rate and a signal loss rate. Correspondingly, in some embodiments, the processing equipment may determine the evaluation result through table look-up, experiment, etc., or determine the evaluation result through an evaluation model. The specific implementation of the evaluation model may be found in FIG. 4 and the related descriptions thereof.

In some embodiments, the processing equipment may update the candidate filtering parameter based on multiple rounds of evaluation results. Exemplarily, the processing equipment may adjust a candidate filtering parameter with a poor evaluation result in each round to obtain a new candidate filtering parameter. The poor evaluation result may include evaluation results such as a noise elimination rate with a low ranking and/or a signal loss rate with a high ranking.

In some embodiments, the processing equipment may also randomly adjust the candidate filtering parameter to obtain a new candidate filtering parameter. For example, when a filtering parameter is randomly adjusted, the processing equipment may increase the filtering strength among the candidate filtering parameter with a higher probability to improve the evaluation result. For example, when a clutter elimination rate is low, it may indicate that the filtering strength is insufficient, and the processing equipment may increase the filtering strength among an original candidate filtering parameter with a higher probability to improve the evaluation result.

After obtaining a new candidate filtering parameter in the above manner, the processing equipment may obtain an evaluation result for the new candidate filtering parameter in the above manner to complete a new round of iteration.

In some embodiments, the processing equipment may stop the iteration when a count of the iteration reaches a preset count, or stop the iteration after the evaluation result meets a preset condition. The preset condition may include that the noise elimination rate and the signal loss rate in the evaluation result reach a preset threshold, etc.

Step S340: performing inverse conversion processing on the effective signal to generate an optimized angle gather signal in a corresponding time window.

In some embodiments, the corresponding time window may be a corresponding window divided based on the range of the reflection time t, and the optimized angle gather signal in the time window may be angle gather data whose window length is within the range of reflection time t, which may fully maintain the AVO features of the original angle gather data. The specific implementation of the time window and maintaining the AVO features may be found in steps S310 to S330 and the related descriptions thereof.

In some embodiments, the processing equipment may convert the effective signal from the feature domain to the angle domain through a third preset formula (3), and generate the optimized angle gather signal in the corresponding time window; the third preset formula (3) is as follows:

$$D(t,\theta)=\Sigma_{R_0}\Sigma_b m(t,R_0,b)*(R_0+b\sin^2\theta) \quad (3).$$

Where $D(t,\theta)$ denotes the optimized angle gather signal, the model parameter $m(t,R_0,b)$ includes the AVO features of the angle gather data; $R_0+b\sin^2\theta$ is used to characterize an AVO effect template that a seismic reflection amplitude changes with the reflection angle $\theta$, $R_0$, b are used to characterize the AVO features, t denotes the reflection time, and $\theta$ denotes the reflection angle.

In some embodiments, after solving the model parameter $m(t,R_0,b)$ by minimizing the second preset formula (2), the processing equipment may eliminate the noise in the pre-denoising angle gather data in the feature domain, and then use the third preset formula (3) to perform an inverse conversion to the angle domain to obtain the denoised angle gather signal. Since an obtained model parameter $m(t, R_0, b)$ may accurately characterize the AVO features of the angle gather data, and a high-resolution inversion result (which is the optimized angle gather signal in the time window) of 1-norm constraint may achieve a more reliable signal-to-noise separation. The inversion algorithm of the compressive sensing theory may fully preserve the AVO features of the angle gather data, and eliminate the noise in the pre-denoising angle gather data at the same time.

Step S350: generating a complete denoised angle gather signal through performing splicing processing for overlapping time windows on the optimized angle gather signal in a plurality of time windows.

In some embodiments, the processing equipment may perform the splicing processing for overlapping time windows on the optimized angle gather signal in the plurality of time windows to obtain a complete angle gather signal, that is, the denoising processing on the AVO features of the pre-stack seismic data is realized.

In the embodiments of the present disclosure, a conversion manner for the AVO features of the pre-stack angle gather, which is used to extend a Radon conversion, may eliminate the noise under the premise of effectively preserving the AVO features of the seismic data, and the denoised angle gather signal is obtained by using the inverse conversion after the denoising, making the denoised angle gather signal accurately characterize the AVO features of the angle gather data to provide real and reliable input data with a high signal-to-noise ratio for AVO or pre-stack inversion, so as to improve resolution and reliability of a pre-stack inversion result.

In some embodiments, the evaluation result of the filtering effect of the candidate filtering parameter may include the noise elimination rate and the signal loss rate; the processing equipment may determine the evaluation result by using the evaluation model based on the candidate filtering parameter, an angle gather feature, and an overlapping parameter, and the evaluation model is a machine learning model.

The angle gather feature may be a feature related to the pre-denoising angle gather data, which may reflect features of the angle gather signal. In some embodiments, the angle gather feature may include an angle range, a time range, a signal frequency range, etc. of an angle gather in the feature domain.

In some embodiments, the processing equipment may obtain the angle gather feature in a plurality of ways, such as performing feature matching on the angle gather data or the angle gather signal by means of table look-up and vector matching, and determining similar or identical angle gather data based on historical evaluation records so that a historical angle gather feature in historical angle gather data may be used as the angle gather feature of current processing equipment.

The overlapping parameter may be a feature related to the time window, which may affect smoothness of a division result. In some embodiments, the overlapping parameter may include an overlapping window count, an overlapping length, smoothness of the overlapping parameter, etc. The smoothness of the overlapping parameter may reflect a continuity of connections between multiple windows. Further description regarding the overlapping parameter may be found in FIG. 5 and the related descriptions thereof.

In some embodiments, the processing equipment may obtain the overlapping parameter in a plurality of ways, such as performing the feature matching on similar overlapping parameters by means of table look-up and vector matching based on the division result, or determining a division requirement and resetting an overlapping parameter based on the angle gather feature.

In some embodiments, the evaluation model may be used to determine an evaluation result of the filtering effect of the candidate filtering parameter. In some embodiments, the evaluation model is a machine learning model, for example, a recurrent neural network (RNN), etc.

Figure 4:
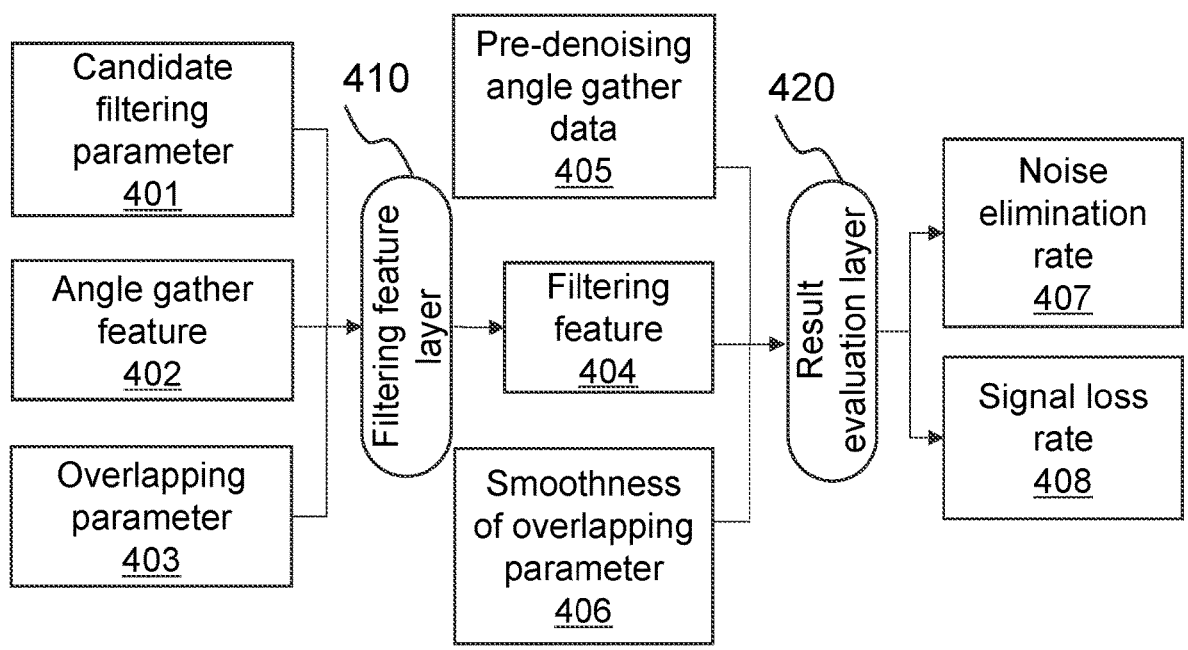
FIG. 4 is a schematic diagram illustrating an evaluation model according to some embodiments of the present disclosure.

FIG. 4 is a schematic diagram illustrating an evaluation model according to some embodiments of the present disclosure.

In some embodiments, as shown in FIG. 4, the processing equipment may use a candidate filtering parameter 401, an angle gather feature 402, and an overlapping parameter 403 as an input of the evaluation model to obtain an evaluation result of a filtering effect of the candidate filtering parameter. Exemplarily, assuming that the candidate filtering parameter 401 include at least a filter type and a filtering strength, the processing equipment may set the filter type, the filtering strength, an angle range of an angle gather in a feature domain, a time range, a signal frequency range, an overlapping window count, an overlapping length as an input of the evaluation model to obtain the evaluation result corresponding to the candidate filtering parameter. Further descriptions regarding the candidate filtering parameter may be found in the related descriptions hereinabove.

In some embodiments, the evaluation model may include a filtering feature layer and a result evaluation layer. The filtering feature layer is configured to determine a filtering feature based on the candidate filtering parameter, the angle gather feature, and the overlapping parameter; and the result evaluation layer is configured to determine the evaluation result based on the filtering feature, pre-denoising angle gather data, and smoothness of the overlapping parameter.

In some embodiments, the filtering feature layer and the result evaluation layer may be machine learning models, including Deep Neural Networks (DNN), Recurrent Neural Networks (RNN), etc., or any combination thereof.

In some embodiments, as shown in FIG. 4, an input of the filtering feature layer 410 may include the candidate filtering parameter 401, the angle gather feature 402 in the feature domain before filtering, and the overlapping parameter 403, and an output of the filtering feature layer 410 may include the filtering feature 404. The filtering feature 404 may be used to reflect a feature filtered based on the candidate filtering parameter 401. An input of the result evaluation layer 420 may include the filtering feature 404, pre-denoising angle gather data 405, and smoothness of overlapping parameter 406, and an output of the result evaluation layer 420 may include a noise elimination rate 407 and a signal loss rate 408 corresponding to the candidate filtering parameter 401.

In some embodiments, the output of the filtering feature layer 410 may be the input of the result evaluation layer 420, the result evaluation layer 420 and the filtering feature layer 410 may be obtained through joint training.

In some embodiments, sample data for joint training include sample filtering features corresponding to a plurality of sample filtering processes, a sample angle gather feature in the feature domain before filtering, a sample overlapping parameter, sample candidate filtering parameters corresponding to a plurality of sample evaluation processes, sample pre-denoising angle gather data, and smoothness of the sample overlapping parameter, and labels are sample noise elimination rates and sample signal loss rates.

The sample filtering features corresponding to the plurality of sample filtering processes, the sample angle gather feature and the sample overlapping parameter in the feature domain before filtering are input into the filtering feature layer 410 to obtain the filtering feature output by the filtering feature layer 410; the filtering feature is used as training sample data, which is input into the result evaluation layer 420 with the filtering feature, the sample pre-denoising angle gather data, and the smoothness of the sample overlapping parameter to obtain the noise elimination rate and the signal loss rate output by the result evaluation layer 420. A loss function is constructed based on the sample noise elimination rate, the sample signal loss rate, and the noise elimination rate and the signal loss rate output by the result evaluation layer 420, and parameters of the result evaluation layer 420 and the filtering feature layer 410 are updated synchronously. Through parameter updating, a trained result evaluation layer 420 and a trained filtering feature layer 410 are obtained.

The labels may be obtained by manual labeling, and the sample candidate filtering parameter may be processed by the two-dimensional filtering processing, the inverse conversion, etc. to obtain a denoised sample angle gather signal, and the denoised sample angle gather signal is compared with the pre-denoising sample angle gather data to determine the sample noise elimination rate and the sample signal loss rate as the labels.

In the embodiment of the present disclosure, compared with a manner of filtering first and then adjusting the candidate filtering parameter according to an actual filtering result, a manner of using the trained evaluation model to evaluate the candidate filtering parameter may quickly select an optimal filtering parameter, thereby improving denoising efficiency. Moreover, parameters of the result evaluation layer may be obtained through the training of the filtering feature layer, which may help solve difficulty in obtaining labels when training the result evaluation layer alone, so that better training data and a better-trained evaluation model may be obtained.

FIG. 5 is an exemplary schematic diagram illustrating a process for determining reflection time t according to some embodiments of the present disclosure. In some embodiments, as shown in FIG. 5, the processing equipment may acquire a distribution feature of pre-denoising angle gather data 510; and the first processor 141 of a denoising device may determine an overlapping parameter 520 for dividing overlapping time windows based on the distribution feature 510; and then perform division processing for overlapping time windows on pre-denoising angle gather data 530 based on the overlapping parameter 520 to determine a range 540 of reflection time t in the pre-denoising angle gather data 530.

The distribution feature of angle gather data may reflect a distribution state of the angle gather data in space and frequency. In some embodiments, the distribution feature may include an angle trace density of the angle gather data, a variation range of the angle gather data, etc.

In some embodiments, the processing equipment may analyze the pre-denoising angle gather data, and obtain the distribution feature in a plurality of ways such as signal feature extraction, vector library matching, etc. Detailed descriptions regarding the distribution feature may be found in FIG. 3 and the related descriptions thereof. Detailed descriptions regarding the angle trace density and the variation range of the angle gather data may be found in the related descriptions hereinafter.

In some embodiments, the overlapping parameter may include at least one of an overlapping window size and an overlapping length. The overlapping parameter may be used to instruct the processing equipment to perform the division processing for overlapping time windows.

In some embodiments, the processing equipment may determine the overlapping parameter for dividing the overlapping time windows according to the distribution feature of the angle gather data in a plurality of ways. For example, the processing equipment may determine the overlapping parameter based on the distribution feature by means of table look-up, vector matching, etc.

In some embodiments, the processing equipment may divide the pre-denoising angle gather data 530 into a plurality of overlapping time windows based on the overlapping parameter such as the overlapping window size and overlapping length, so as to determine the range 540 of the reflection time t in the pre-denoising angle gather data 530 based on the plurality of overlapping time windows.

An exemplary manner for determining the overlapping parameter is given below, and a specific implementation manner for obtaining the overlapping parameter is described in detail.

In some embodiments, the distribution feature may include the angle trace density of an angle gather, and the variation range of the angle gather data. Correspondingly, the processing equipment may determine a candidate overlapping parameter through the first processor of the denoising device based on the distribution feature and the overlapping window size; evaluate smoothness of the candidate overlapping parameter based on the first processor; and determine the overlapping parameter through performing at least one adjustment on the candidate overlapping parameter by the first processor based on the smoothness of the candidate overlapping parameter.

The angle trace density may be used to measure a density of the angle gather data. In some embodiments, the angle trace density may be a ratio of a data count in the angle gather data to a range of the angle gather data. For example, the angle gather data includes 5000 pieces of angle trace data, a maximum value of the angle trace data is a, and a minimum value of the angle trace data is b, then the angle trace density is 5000/(a-b). In some embodiments, the angle trace density may affect the overlapping length in the overlapping parameter, the smaller the angle trace density, the longer the required overlapping length, making a data count in the window more stable.

The variation range of the angle gather data is a ratio of a difference between the maximum value and the minimum value of the angle trace data to the minimum value. For example, if the maximum value of the angle trace data is a, and the minimum value of the angle trace data is b, then the variation range of the angle gather data is (a-b)/b.

In some embodiments, the processing equipment may determine the candidate overlapping parameter based on the angle trace density, the variation range of the angle gather data by means of experience or table look-up, etc. In some embodiments, the processing equipment may obtain a corresponding reference overlapping parameter from a denoising record with a good denoising effect among historical records, and then adjust the reference overlapping parameter based on the angle trace density and the variation range of the angle gather data, so that the obtained candidate overlapping parameter may meet a denoising requirement.

The reference overlapping parameter may include an average value of parameters corresponding to denoising records with good denoising effects in historical data, such as an average value of overlapping time window counts, an average value of the overlapping window sizes, an average value of the overlapping lengths, etc. For example, in the historical records, if the denoising effect of data A, B, C, D, and E is better, the processing equipment may use an average value of the reference overlapping time window counts, an average value of the reference overlapping window sizes and an average value of the reference overlapping lengths corresponding to the data A, B, C, D, and E as the reference overlapping parameter.

Correspondingly, in some embodiments, when the candidate overlapping parameter is adjusted, an adjustment range may be related to a difference between the angle trace density and the reference angle trace density, and a difference between a variation range of the angle gather and a variation range of the reference angle gather.

The reference angle trace density may be an average value of angle trace densities corresponding to denoising records with better denoising effects in the historical data.

The variation range of the reference angle gather may be an average value of variation ranges of the angle gather data corresponding to the denoising records with better denoising effects in the historical data.

In some embodiments, an adjustment direction may be related to the positive or negative of the difference between the angle trace density and the reference angle trace density, and the adjustment range may be related to an absolute value of the difference between the angle trace density and the reference angle trace density. Exemplarily, if the difference between the angle trace density and the reference angle trace density is less than 0, the candidate overlapping length may be increased on the basis of the reference overlapping length, and the greater the absolute value of the difference, the greater the increasing range. If the difference between the angle trace density and the reference angle trace density is greater than 0, the candidate overlapping length may be reduced on the basis of the reference overlapping length, and the greater the absolute value of the difference value, the greater the reducing range.

It should be noted that a same batch of historical data (for example, the above data A, B, C, D, and E) may be used for calculating the reference overlapping parameter, the reference angle trace density, and the variation range of the reference angle gather. Other statistical manners, such as calculating medians, expected values, etc., may also be used for the reference overlapping parameter, the reference angle trace density, and the variation range of the reference angle gather.

In some embodiments, the smoothness of the candidate overlapping parameter may be used to measure continuity between a plurality of windows in the candidate overlapping parameter. The higher the smoothness, the more accurate the result of subsequent denoising processing obtained through divided overlapping time windows, and the greater the evaluation calculation pressure.

In some embodiments, the processing equipment may determine the smoothness in various manners such as table look-up, etc. The processing equipment may determine a corresponding smoothness based on the candidate overlapping parameter according to a corresponding relationship between an overlapping parameter and smoothness in a table.

In some embodiments, the processing equipment may acquire a statistical feature of a division result of the overlapping time windows based on the candidate overlapping parameter, wherein the statistical feature includes a data similarity of adjacent overlapping time windows and variance of data in the overlapping time windows; and determine the smoothness of the candidate overlapping parameter based on the statistical feature.

The statistical feature may be used to reflect the data similarity or a data difference in the adjacent overlapping time windows. In some embodiments, the processing equipment may divide the pre-denoising angle gather data based on the candidate overlapping parameter, and then calculate parameters such as the data similarity of the adjacent overlapping time windows, the variance of data in the overlapping time windows, etc. based on the divided overlapping time windows to determine the statistical feature corresponding to the candidate overlapping parameter.

In some embodiments, the processing equipment may calculate to obtain the smoothness of the candidate overlapping parameter based on the data similarity of the adjacent overlapping time windows and the variance of data in the overlapping time windows. Exemplarily, the processing equipment may determine the smoothness of the candidate overlapping parameter through the following formula (4).

$$P=k_1*S-k_2*V \quad (4).$$

Where P denotes the smoothness of the candidate overlapping parameter, $k_1$ and $k_2$ respectively denote coefficients greater than 0, S denotes an average similarity of the adjacent overlapping time windows, and V denotes average variance of data in the overlapping time windows.

In the embodiment of the present disclosure, the processing equipment may quickly determine the smoothness of the overlapping parameter by using the statistical feature of the candidate overlapping parameter, further improving denoising efficiency.

In some embodiments, the processing equipment may designate an adjusted candidate overlapping parameter as the overlapping parameter when the smoothness of the adjusted candidate overlapping parameter is greater than a threshold. That is, during an adjustment process, if the smoothness of the adjusted candidate overlapping parameter meets the threshold, the adjusted candidate overlapping parameter is designated as the overlapping parameter.

In some embodiments, the processing equipment may adjust the candidate overlapping parameter by increasing the overlapping length in response to the smoothness of the candidate overlapping parameter meeting a preset threshold condition; in response to the smoothness of the candidate overlapping parameter not meeting the preset threshold condition, adjust the candidate overlapping parameter by reducing the overlapping length; and in response to a determination that a manner adopted in an adjustment is different from that adopted in a previous adjustment, determine that in the adjustment, an adjustment amount of the overlapping length is half of an adjustment amount in the previous adjustment.

The preset threshold condition includes that the smoothness of the candidate overlapping parameter is less than a preset threshold, which may be used to determine the adjustment direction and the adjustment range. In some embodiments, the processing equipment may determine the preset threshold according to a reference smoothness in a denoising process with a better denoising effect in history, so that an adjusted smoothness may be close to the preset threshold. The processing equipment may also determine the preset threshold in other ways such as table look-up, etc.

In some embodiments, the processing equipment may adjust the candidate overlapping parameter according to the smoothness, that is, if current smoothness is less than the preset threshold (i.e., the preset threshold condition is met), the overlapping length is increased; otherwise, the overlapping length is decreased. If the adjustment direction is opposite to the adjustment direction of the previous adjustment, the adjustment range is half of that of the previous adjustment, making the smoothness gradually approaches the preset threshold.

Exemplarily, in a first adjustment, if smoothness of the candidate overlapping parameter before an adjustment is less than the preset threshold of 10 m, the overlapping length is increased by 1 m; if smoothness of the candidate overlapping parameter after the adjustment is still less than the preset threshold of 10 m, then a second adjustment is performed. In the second adjustment, on the basis of the first adjustment, the overlapping length is increased by 1 m again, and the smoothness of the candidate overlapping parameter after the adjustment is greater than the preset threshold 10 m, then a third adjustment is performed. In the third adjustment, on the basis of the second adjustment, the overlapping length is reduced by 0.5 m, and so on, making the smoothness gradually approach the preset threshold of 10 m.

In the embodiment of the present disclosure, the smoothness may be adjusted by means of step adjustment, and the step adjustment range may be reduced when an adjustment direction is changed, so that the smoothness may be further close to the preset threshold to obtain a desired smoothness.

In some embodiments, the processing equipment may stop the adjustment of the candidate overlapping parameter in response to meeting an adjustment ending condition, and determine the overlapping parameter based on the adjusted candidate overlapping parameter. The adjustment ending condition may include that the smoothness of the candidate overlapping parameter meets a preset smoothness condition.

In some embodiments, the preset smoothness condition may include that a difference value between the smoothness of the candidate overlapping parameter and the preset threshold (which refers to the absolute value of a difference between the smoothness of the candidate overlapping parameter and the preset threshold) is the minimum, that is, after multiple iterations in succession, the difference value is no longer changed, which may indicate that the smoothness is close to or reaches the preset threshold, and then the adjustment of the candidate overlapping parameter is stopped.

In the embodiment of the present disclosure, the processing equipment may obtain a plurality of candidate overlapping parameters that meet accuracy by adjusting the overlapping parameter for many times, so that an overlapping parameter that not only meets the accuracy but also reduces the calculation pressure may be conveniently and quickly selected.

In some embodiments, the processing equipment may determine a candidate overlapping parameter with a lowest smoothness among candidate overlapping parameters whose smoothness meet the preset threshold condition as the overlapping parameter.

Exemplarily, if the preset threshold is 7, and there are the candidate overlapping parameters with smoothness of 7.20, 7.13, 7.40, 7.7, 7.08, 7.85, and 7.66 higher than 7 among the candidate overlapping parameters, and then the candidate overlapping parameter with the minimum smoothness of 7.08 may be selected as the overlapping parameter.

In the embodiment of the present disclosure, since the smoothness is higher than the preset threshold, an accuracy requirement of a result may be met. On the basis, the processing equipment may select a candidate overlapping parameter with a minimum smoothness from the candidate overlapping parameters with smoothness higher than the preset threshold, which can reduce computing pressure and improve computing efficiency as much as possible while meeting the accuracy requirement.

In some optional embodiments, the processing equipment may also use a sixth preset formula to invert a fifth preset formula to generate a model parameter $m(t,R_0,b)$; Therefore, the pre-denoising angle gather data is converted from an angle domain to a feature domain.

The fifth preset formula (5) is as follows:

$$D(t,\theta)=\Sigma_{R_0}\Sigma_b m(t,R_0,b)*(R_0+b\sin^2\theta) \quad (5).$$

The sixth preset formula (6) is as follows:

$$\|Rm-d\|_2^2+\lambda\|m\|_1 \quad (6).$$

Where $D(t,\theta)$ denotes the angle gather signal, $R_0+b\sin^2\theta$ is used to characterize an AVO effect template that a seismic reflection amplitude changes with a reflection angle $\theta$, and the model parameter $m(t,R_0,b)$ includes AVO features of the angle gather data. T denotes time, $\theta$ denotes the reflection angle; d denotes the angle gather data; parameter $R_0$, b are used to characterize the AVO features. R denotes an AVO effect template matrix that the seismic reflection amplitude changes with the reflection angle $\theta$, $\lambda$ denotes a weight factor, which is greater than 0, and m denotes the model parameter.

In some embodiments, the model parameter $m(t,R_0,b)$ may be used to characterize the AVO features in the angle gather data (i.e., the pre-denoising angle gather signal).

In some embodiments, the processing equipment may solve the model parameter $m(t,R_0,b)$ by inverting the fifth preset formula (5), and then separate the angle gather data and noise during a domain conversion process. In some embodiments, the processing equipment may solve a converted model parameter $m(t,R_0,b)$ through inverting the fifth preset formula (5) based on a compressive sensing manner, i.e., an inversion manner based on studying 1-norm constraint, to obtain a high-resolution result, so as to achieve an accurate separation of the angle gather data and the noise.

In some embodiments, after solving the model parameter m by minimizing the sixth preset formula (6), the processing equipment may eliminate noise in the pre-denoising angle gather data, and then use the fifth preset formula (5) to perform a forward conversion to obtain a denoised angle gather signal. Since the obtained model parameter m may accurately characterize the AVO features of the angle gather data, and the high-resolution inversion result of the 1-norm constraint may achieve a more reliable signal-to-noise separation, thus, the conversion process may fully preserve the AVO features of the angle gather data while eliminating the noise in the angle gather data.

Those of ordinary skill in the art may understand that all or part of steps in various manners of the above embodiments may be completed by instructions, or controlling related hardware through instructions, and the instructions may be stored in a non-transitory computer-readable storage medium, and loaded and executed by a processor.

Therefore, the embodiments of the present disclosure provide a storage medium in which a plurality of instructions are stored, and the instructions may be executed by at least one processor to implement steps in the denoising method for preserving the AVO features of pre-stack seismic data provided by the embodiments of the present disclosure. The specific implementation manner may be found in FIGS. 2-5 and the related descriptions thereof.

Compared with the prior art, the present disclosure has the following advantages.

In the embodiment of the present disclosure, a denoising method and a denoising system for preserving AVO features are provided based on compressive sensing, the method and the system may eliminate noise by using a conversion manner for the AVO features of a pre-stack angle gather based on extending a Randon conversion under a premise of effectively preserving the AVO features of seismic data, which provides real and reliable input data with a high signal-to-noise ratio for AVO or a pre-stack inversion and plays vital roles in obtaining a high-resolution and reliable pre-stack inversion result.

Having thus described the basic concepts, it may be rather apparent to those skilled in the art after reading this detailed disclosure that the foregoing detailed disclosure is intended to be presented by way of example only and is not limiting. Although not explicitly described herein, various modifications, improvements, and corrections to the present disclosure may be made by those skilled in the art. Such modifications, improvements, and corrections are suggested in the present disclosure, so such modifications, improvements, and corrections still belong to the spirit and scope of the embodiments of the present disclosure.

Meanwhile, the present disclosure uses specific words to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, certain features, structures, or characteristics in one or more embodiments of the present disclosure may be properly combined.

In addition, unless explicitly stated in the claims, the order of processing elements and sequences described in the present disclosure, the use of numbers, letters, or the use of other names is not intended to limit the order of the processes and methods of the present disclosure. Although the above disclosure discusses some embodiments of the disclosure currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this method of disclosure does not imply that the subject matter of the description requires more features than that are recited in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." Unless stated otherwise, "about", "approximately" or "substantially" means that a variation of ±20% is allowed for the stated number. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical fields and parameters used in some embodiments of the present disclosure to confirm the breadth of their ranges are approximations, in specific embodiments, such numerical values are set as precisely as practicable.

For each patent, patent application, patent application publication, and other material, such as article, book, specification, publication, document, etc., cited in the present specification, the entire contents of which are hereby incorporated into the present disclosure for reference. Historical application documents that are inconsistent with or conflict with the content of the present disclosure are excluded, and documents (currently or later appended to the present disclosure) that limit the broadest scope of the claims of the present disclosure are excluded. It should be noted that, if there is any inconsistency or conflict between the descriptions, definitions, and/or usage of terms in the accompanying materials of the present disclosure and the contents of the present disclosure, the descriptions, definitions, and/or usage of terms in the present disclosure shall prevail.

Finally, it is to be understood that the embodiments of the application disclosed herein are illustrative of the principles of the embodiments of the present disclosure. Other variations are also possible within the scope of the present disclosure. Therefore, by way of example and not limitation, alternative configurations of the embodiments of the present disclosure may be considered consistent with the teachings of the present disclosure. Accordingly, embodiments of the present disclosure are not limited to that precisely as shown and described.

What is claimed is:

1. A denoising method for preserving amplitude variation with offset (AVO) features of pre-stack seismic data based on extended Radon transform, wherein the method comprises:
    acquiring seismic wave data at at least one receiving point through a seismic signal acquisition device, and storing the seismic wave data in a memory, wherein the seismic signal acquisition device includes a seismic exploration instrument and a seismic geophone;
    in response to ending of an acquisition operation for a seismic signal with the seismic signal acquisition device, determining, based on the seismic wave data in the memory, pre-denoising angle gather data through a processing device, including:
        identifying abnormal signal in the memory;
        eliminating the abnormal signal; and
        designating entire remaining seismic wave data as the pre-denoising angle gather data; and
    obtaining and outputting a denoised angle gather signal through inputting the pre-denoising angle gather data to a denoising device and performing denoising processing on the pre-denoising angle gather data based on the denoising device, including:
    determining a range of t in an angle gather through performing division processing for overlapping time windows on an input angle gather;
    converting the input angle gather from an angle domain to a feature domain by a compressive sensing algorithm based on the range of t in the angle gather;
    obtaining a model parameter $m(t,R_0,b)$ through inverting a formula (1) by a formula (2) based on the range of t in the angle gather, and converting the angle gather in the pre-stack seismic data from the angle domain to the feature domain using the model parameter $m(t, R_0, b)$;

$$D(t,\theta)=\Sigma_{R_0}\Sigma_b m(t,R_0,b)*(R_0+b\ \sin^2\theta) \quad (1);$$

$$\|Rm-d\|_2^2+\lambda\|m\|_1 \quad (2);$$

wherein $D(t, \theta)$ denotes angle gather data, $R_0+b\ \sin^2\theta$ characterizes an AVO effect template that a seismic reflection amplitude changes with an angle, and the model parameter $m(t, R_0, b)$ in a transform space comprises AVO features of data; t denotes time, $\theta$ denotes an angle; d denotes the data; and $R_0$, b is used to characterize the AVO features;
    obtaining an effective signal maintaining AVO features of original data by performing filtering processing on the angle gather in the feature domain, including:
        selecting at least one set of candidate filtering parameters through vector matching based on a signal frequency distribution feature and a data noise feature in the pre-denoising angle gather data;
        generating an evaluation result by evaluating a filtering effect of the at least one set of candidate filtering parameters, including:
            determining the evaluation result by using an evaluation model based on the at least one set of candidate filtering parameter, an angle gather feature, and an overlapping parameter, wherein the evaluation model is a machine learning model, the evaluation model includes a filtering feature layer and a result evaluation layer, wherein
            an input of the filtering feature layer includes the at least one set of candidate filtering parameter, the angle gather feature in the feature domain before filtering, and the overlapping parameter, and an output of the filtering feature layer includes the filtering feature;
            an input of the result evaluation layer includes the filtering feature, the pre-denoising angle gather data, and smoothness of the overlapping parameter, and an output of the result evaluation layer includes a noise elimination rate and a signal loss rate corresponding to the candidate filtering parameter;
            the output of the filtering feature layer is the input of the result evaluation layer, the result evaluation layer and the filtering feature layer are obtained through joint training; and
            the evaluation result includes the noise elimination rate and the signal loss rate;
        performing a plurality of rounds of iterative updating on the at least one set of the candidate filtering parameters based on the evaluation result to obtain an optimal filtering parameter;

performing a two-dimensional filtering processing on the pre-denoising angle gather data in the feature domain with the optimal filtering parameter to generate an effective signal that meets a preset condition, wherein the optimal filtering parameter includes at least one of a filter type and filtering strength;

obtaining optimized angle gather data in a corresponding time window through performing inverse conversion processing on the effective signal;

obtaining a complete angle gather signal through performing splicing processing for overlapping time windows on the optimized angle gather data in a plurality of time windows, to realize denoising processing for preserving the AVO features of the pre-stack seismic data; and sending the denoised angle gather signal and the pre-denoising angle gather data to a user terminal for display and confirmation, wherein the user terminal displays the denoised angle gather signal and the pre-denoising angle gather data for users by displaying images and videos and according to information on the user terminal, the user visually views changes in angle gather signals before and after denoising to confirm a denoising effect to determine whether a denoising result is available.

2. The denoising method according to claim 1, wherein the model parameter $m(t,R_0,b)$ is obtained through inverting the formula (1) based on an inversion algorithm of a compressive sensing theory.

3. The denoising method according to claim 1, wherein the effective signal maintaining the AVO features of the original data is obtained through performing the two-dimensional filtering processing on the angle gather in the feature domain.

4. The denoising method according to claim 1, wherein the optimized angle gather data in the corresponding time window is obtained through performing the inverse conversion processing on the effective signal using the formula (1).

5. A denoising system for preserving AVO features of pre-stack seismic data based on extended Radon transform, wherein the system is applied to the denoising method of claim 1, and the system comprises:

a seismic signal acquisition device configured to acquire seismic wave data at at least one receiving point, wherein the seismic signal acquisition device includes a seismic exploration instrument and a seismic geophone;

a memory configured to store the seismic wave data;

a processing device configured to determine pre-denoising angle gather data based on the seismic wave data, wherein to determine pre-denoising angle gather data based on the seismic wave data, the processing device is further configured to:
  identify abnormal signal in the memory;
  eliminate the abnormal signal; and
  designate entire remaining seismic wave data as the pre-denoising angle gather data;

a denoising device configured to perform denoising processing on the pre-denoising angle gather data to obtain and output a denoised angle gather signal, including:

a first processing module configured to determine a range of t in an angle gather through performing division processing for overlapping time windows on an input angle gather;

a conversion module configured to convert the input angle gather from an angle domain to a feature domain by a compressive sensing algorithm based on the range of t in the angle gather;

a filtering module configured to obtain an effective signal maintaining AVO features of original data by performing filtering processing on the angle gather in the feature domain, wherein to obtain the effective signal maintaining AVO features of the original data, the filtering module is further configured to:
  select at least one set of candidate filtering parameters through vector matching based on a signal frequency distribution feature and a data noise feature in the pre-denoising angle gather data;
  generate an evaluation result by evaluating a filtering effect of the at least one set of candidate filtering parameters, wherein to generate the evaluation result by evaluating the filtering effect of the at least one set of candidate filtering parameters, the filtering module is further configured to:
    determine the evaluation result by using an evaluation model based on the at least one set of candidate filtering parameter, an angle gather feature, and an overlapping parameter, wherein the evaluation model is a machine learning model, the evaluation model includes a filtering feature layer and a result evaluation layer, wherein
    an input of the filtering feature layer includes the at least one set of candidate filtering parameter, the angle gather feature in the feature domain before filtering, and the overlapping parameter, and an output of the filtering feature layer includes the filtering feature;
    an input of the result evaluation layer includes the filtering feature, the pre-denoising angle gather data, and smoothness of the overlapping parameter, and an output of the result evaluation layer includes a noise elimination rate and a signal loss rate corresponding to the candidate filtering parameter;
    the output of the filtering feature layer is the input of the result evaluation layer, the result evaluation layer and the filtering feature layer are obtained through joint training; and
    the evaluation result includes the noise elimination rate and the signal loss rate;
  perform a plurality of rounds of iterative updating on the at least one set of the candidate filtering parameters based on the evaluation result to obtain an optimal filtering parameter;
  perform a two-dimensional filtering processing on the pre-denoising angle gather data in the feature domain with the optimal filtering parameter to generate an effective signal that meets a preset condition, wherein the optimal filtering parameter includes at least one of a filter type and filtering strength;

an inverse transform module configured to obtain optimized angle gather data in a corresponding time window through performing inverse conversion processing on the effective signal;

a second processing module configured to obtain a complete angle gather signal through performing splicing processing for overlapping time windows on the optimized angle gather data in a plurality of time windows, to realize denoising processing for preserving the AVO features of the pre-stack seismic data; and send the denoised angle gather signal and the pre-denoising angle gather data to a user terminal for display and confirmation, wherein the user terminal displays the denoised angle gather signal and the pre-denoising angle gather data for users by displaying images and videos, and according to information on the user terminal, the user visually views changes in angle gather signals before and after denoising to confirm a denoising effect to determine whether a denoising result is available.

6. A non-transitory computer-readable storage medium, wherein computer-executable instructions are stored in the computer-readable storage medium, and the computer-executable instructions are used to implement the method of claim 1 when executed by at least one processor.

7. The method of claim 1, wherein the determining a range of t in an angle gather through performing division processing for overlapping time windows on an input angle gather includes:
   acquiring a distribution feature of the pre-denoising angle gather data;
   determining the overlapping parameter for dividing the overlapping time windows by a first processor of the denoising device based on the distribution feature; and
   performing the division processing for the overlapping time windows on the pre-denoising angle gather data by the first processor of the denoising device, based on the overlapping parameter, to determine a range of reflection time t' in the pre-denoising angle gather data.

8. The method of claim 7, wherein the distribution feature includes a angle trace density of the angle gather, and a variation range of the angle gather data, wherein the method further includes:
   determines a candidate overlapping parameter by a processing equipment through the first processor of the denoising device based on the distribution feature and overlapping window size;
   evaluating smoothness of the candidate overlapping parameter based on the first processor; and
   determining the overlapping parameter through performing at least one adjustment on the candidate overlapping parameter by the first processor based on the smoothness of the candidate overlapping parameter.

9. The method of claim 8, wherein the evaluating smoothness of the candidate overlapping parameter includes:
   acquiring a statistical feature of a division result of the overlapping time windows based on the candidate overlapping parameter, wherein the statistical feature includes a data similarity of adjacent overlapping time windows and variance of data in the overlapping time windows; and
   determining the smoothness of the candidate overlapping parameter based on the statistical feature.

10. The method of claim 8, wherein the method further includes:
    adjusting the candidate overlapping parameter according to the smoothness of the candidate overlapping parameter, including:
    if a current smoothness is less than a preset threshold, increasing an overlapping length;
    if the current smoothness is greater than or equal to the preset threshold, decreasing the overlapping length;
    if a adjustment direction is opposite to a adjustment direction of a previous adjustment, a adjustment range is half of an adjustment range of the previous adjustment, making the smoothness of the candidate overlapping parameter gradually approaches the preset threshold.

11. The method of claim 8, wherein the method further includes:
    in response to meeting an adjustment ending condition, stopping the adjustment of the candidate overlapping parameter; and
    determining the overlapping parameter based on the adjusted candidate overlapping parameter, including:
    determining a candidate overlapping parameter with a lowest smoothness among candidate overlapping parameters whose smoothness meet a preset threshold condition as the overlapping parameter, wherein the adjustment ending condition include that the smoothness of the candidate overlapping parameter meets a preset smoothness condition, and the preset smoothness condition includes that a absolute value of a difference between the smoothness of the candidate overlapping parameter and a preset threshold is minimum.

12. The method of claim 1, wherein the joint training includes:
    inputting sample filtering features corresponding to a plurality of sample filtering processes, sample angle gather feature, and sample overlapping parameter in the feature domain before filtering into the filtering feature layer to obtain the filtering feature output by the filtering feature layer;
    using the filtering feature as training sample data, which is input into the result evaluation layer with the filtering feature, sample pre-denoising angle gather data, and smoothness of the sample overlapping parameter to obtain the noise elimination rate and the signal loss rate output by the result evaluation layer;
    constructing a loss function based on a sample noise elimination rate, a sample signal loss rate, and the noise elimination rate and the signal loss rate output by the result evaluation layer;
    updating parameters of the result evaluation layer and the filtering feature layer synchronously; and
    obtaining a trained result evaluation layer and a trained filtering feature layer through parameter updating.

\* \* \* \* \*